Dec. 9, 1952 W. LINDSAY 2,620,711
HYDRAULICALLY OPERATED DUPLEX BOX MACHINE
Filed July 20, 1949 11 Sheets-Sheet 1
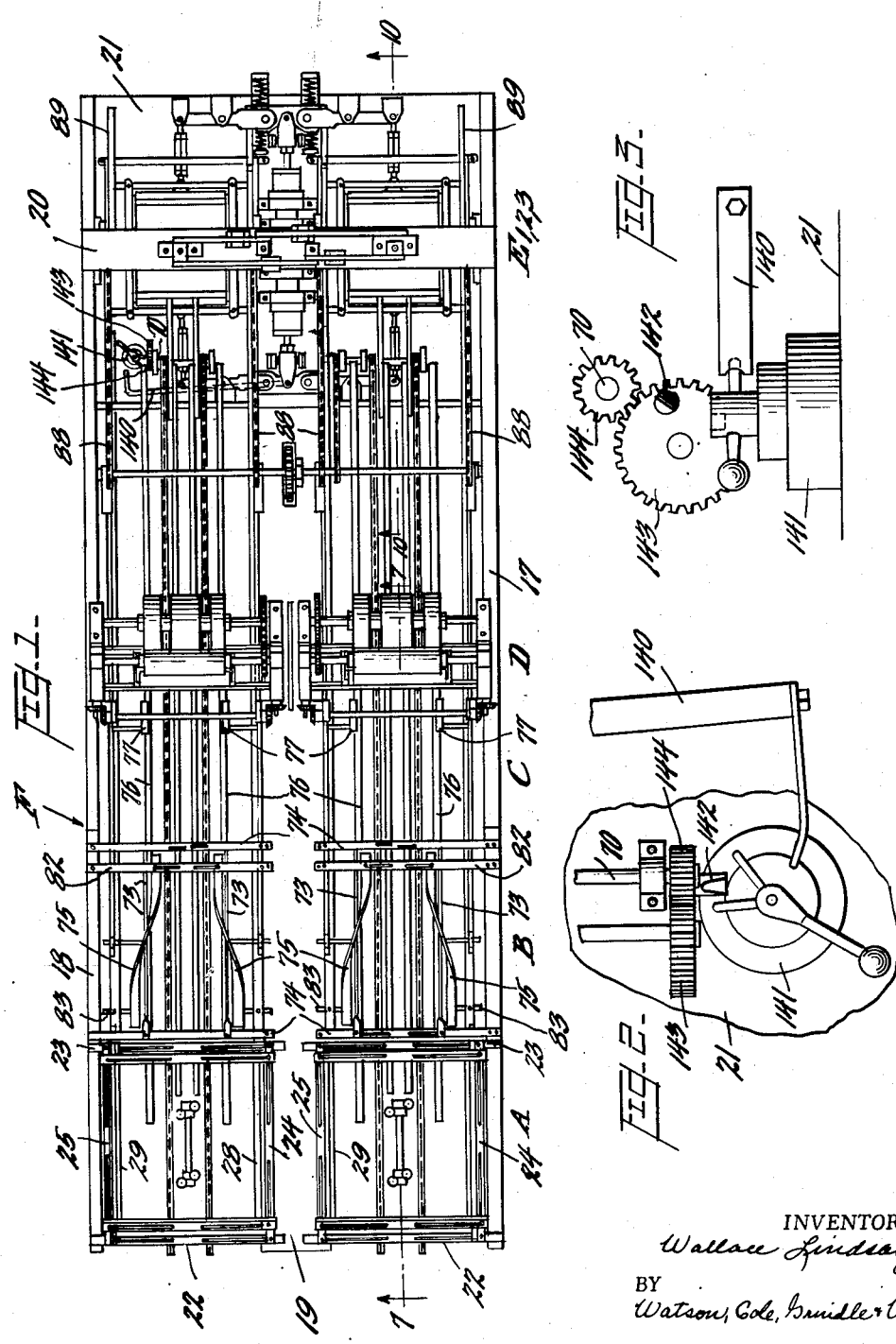
INVENTOR.
Wallace Lindsay
BY
Watson, Cole, Grindle & Watson
ATTORNEYS

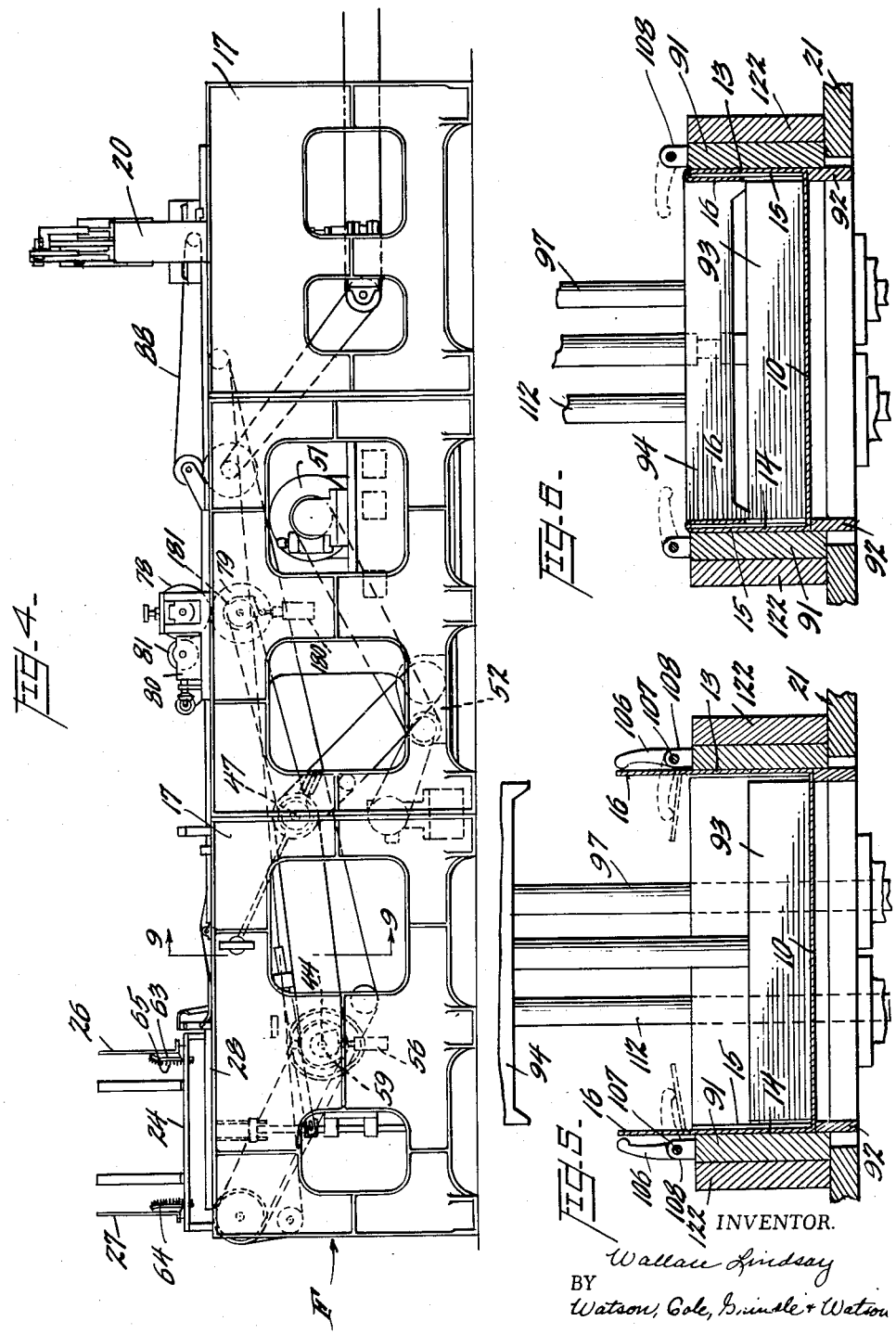

Dec. 9, 1952 W. LINDSAY 2,620,711
HYDRAULICALLY OPERATED DUPLEX BOX MACHINE
Filed July 20, 1949 11 Sheets-Sheet 3
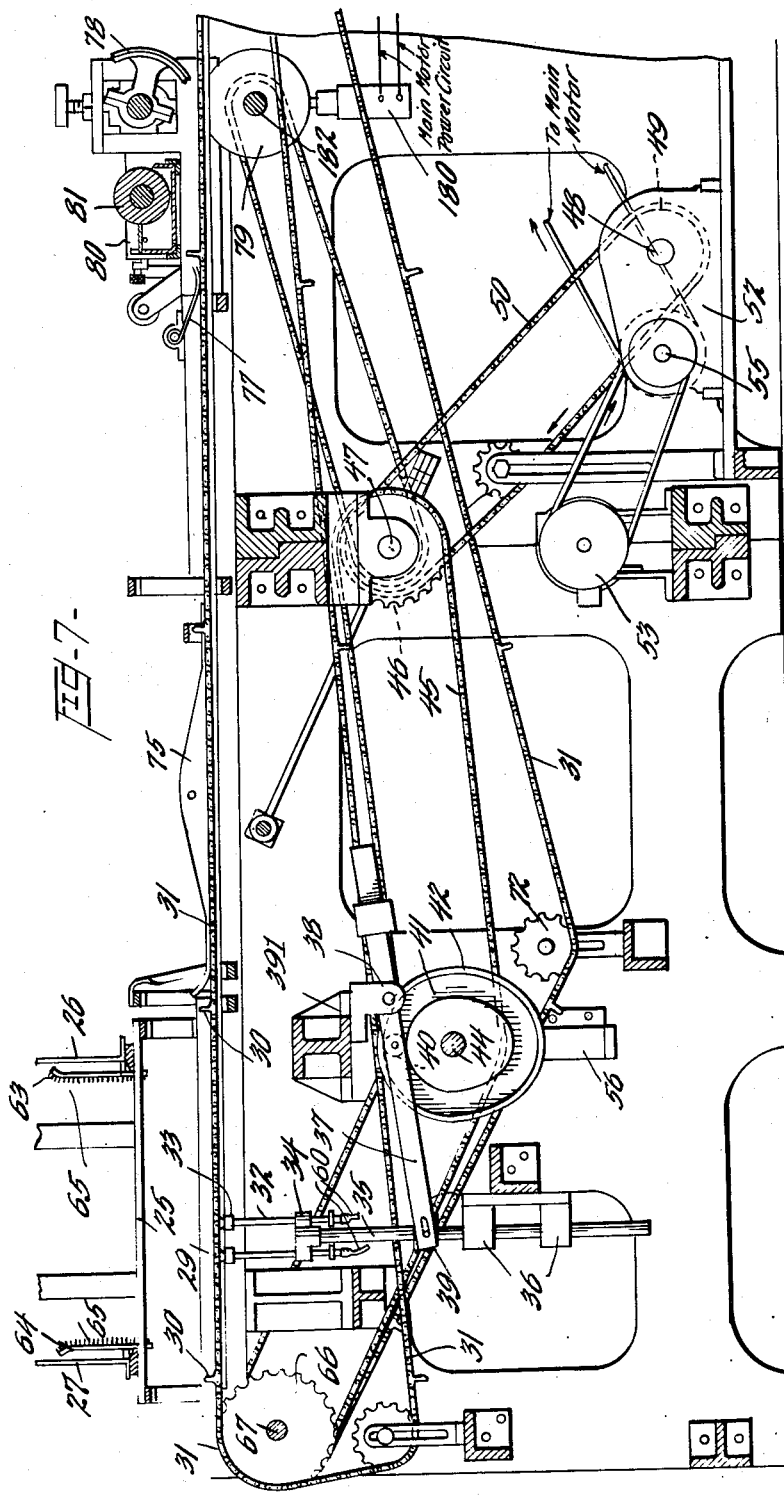
INVENTOR.
Wallace Lindsay
By
Watson Cole, Grindle & Watson
ATTORNEYS Dec. 9, 1952 W. LINDSAY 2,620,711
HYDRAULICALLY OPERATED DUPLEX BOX MACHINE
Filed July 20, 1949 11 Sheets-Sheet 4
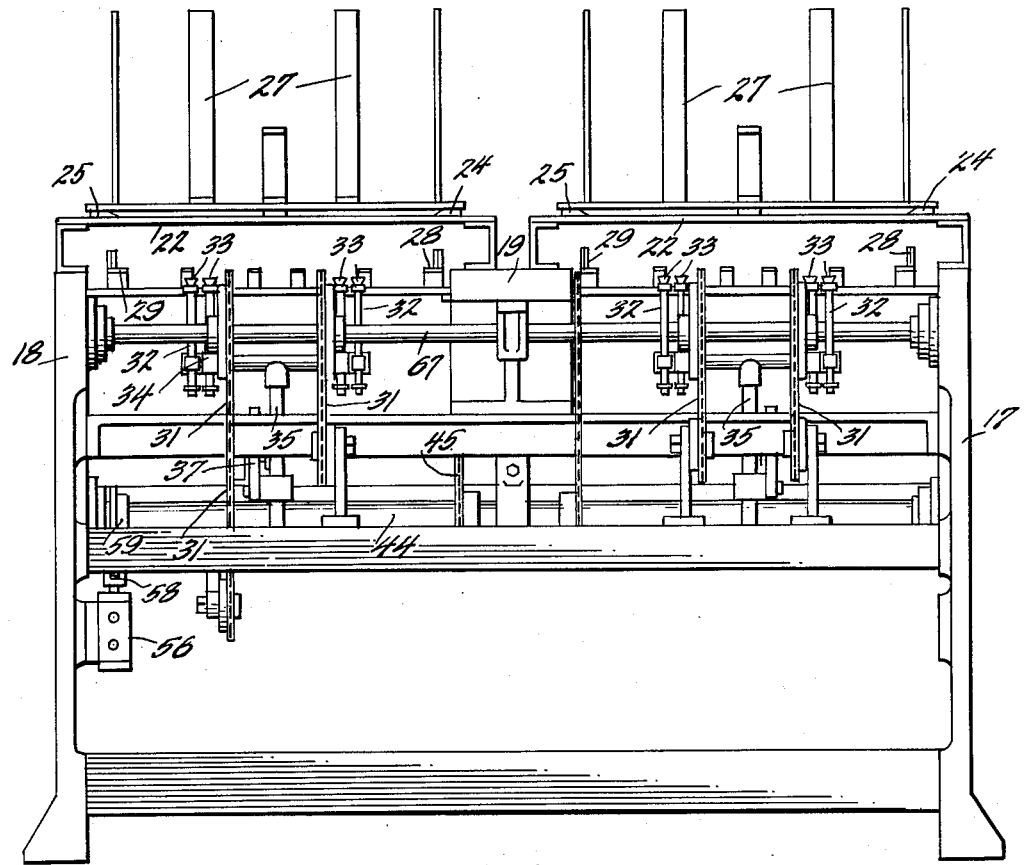
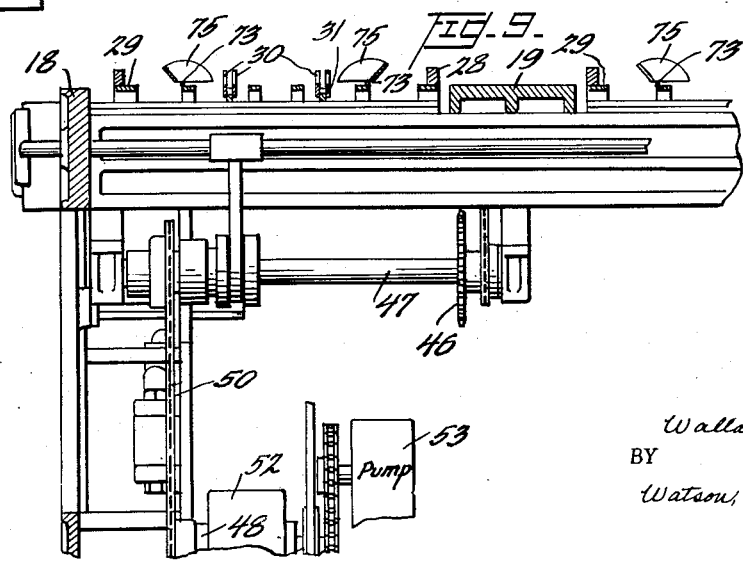
INVENTOR.
Wallace Lindsay
BY
Watson, Cole, Grindle & Watson
ATTORNEYS

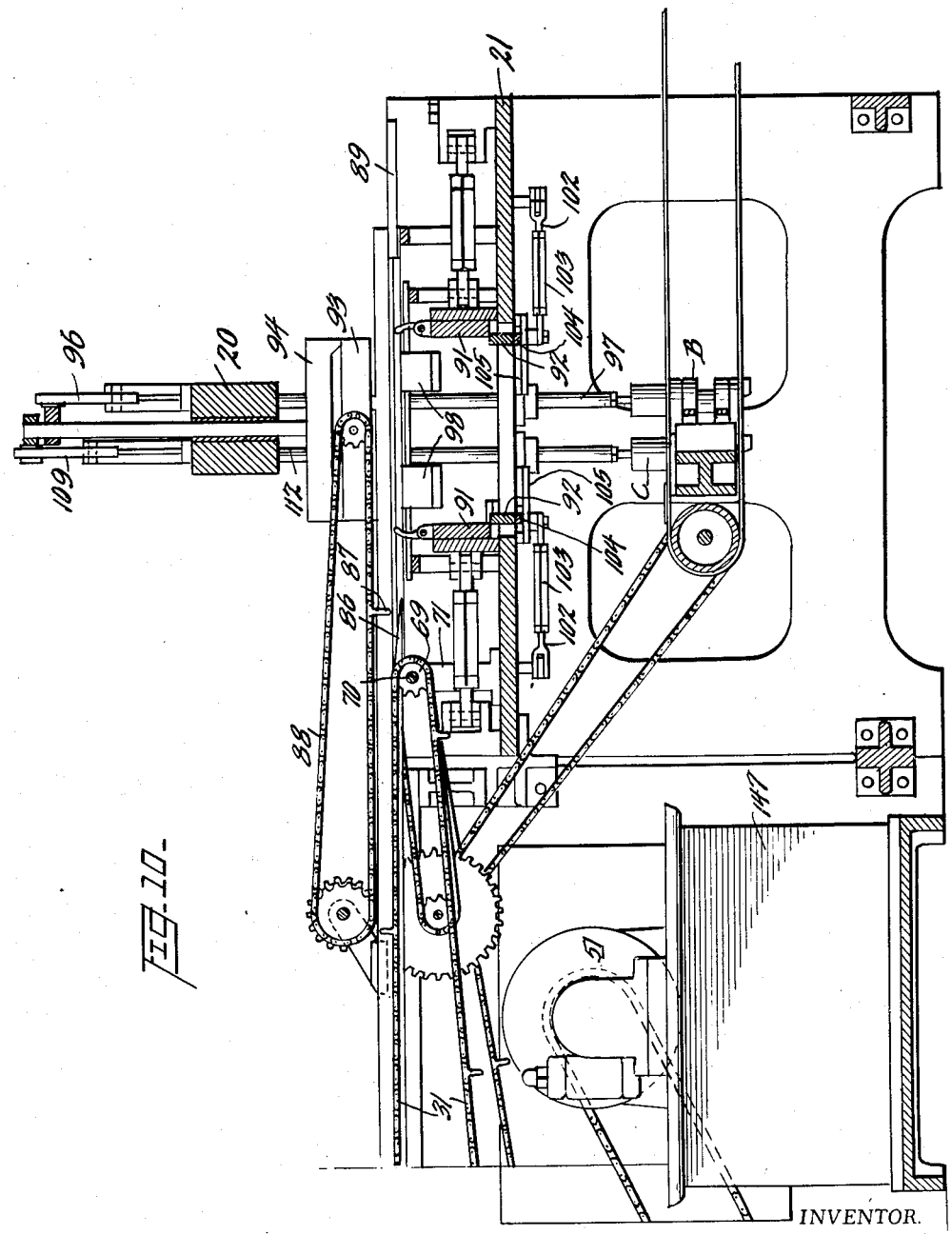

Dec. 9, 1952 W. LINDSAY 2,620,711
HYDRAULICALLY OPERATED DUPLEX BOX MACHINE
Filed July 20, 1949 11 Sheets-Sheet 6
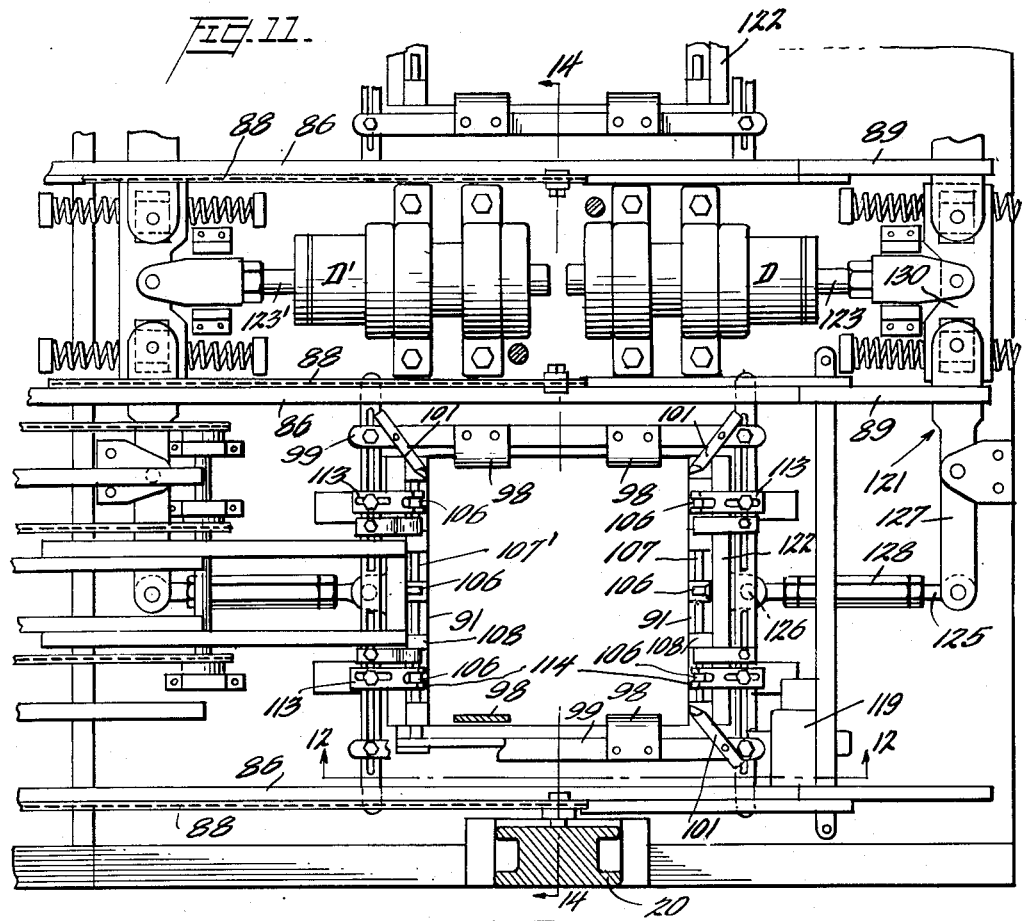
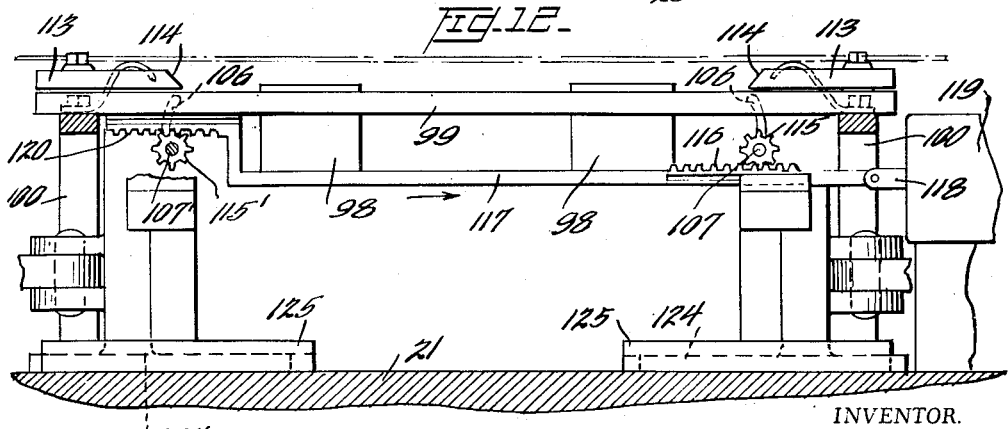
INVENTOR.
Wallace Lindsay
BY
Watson, Cole, Grindle & Watson
ATTORNEYS Dec. 9, 1952        W. LINDSAY        2,620,711
HYDRAULICALLY OPERATED DUPLEX BOX MACHINE
Filed July 20, 1949        11 Sheets-Sheet 7
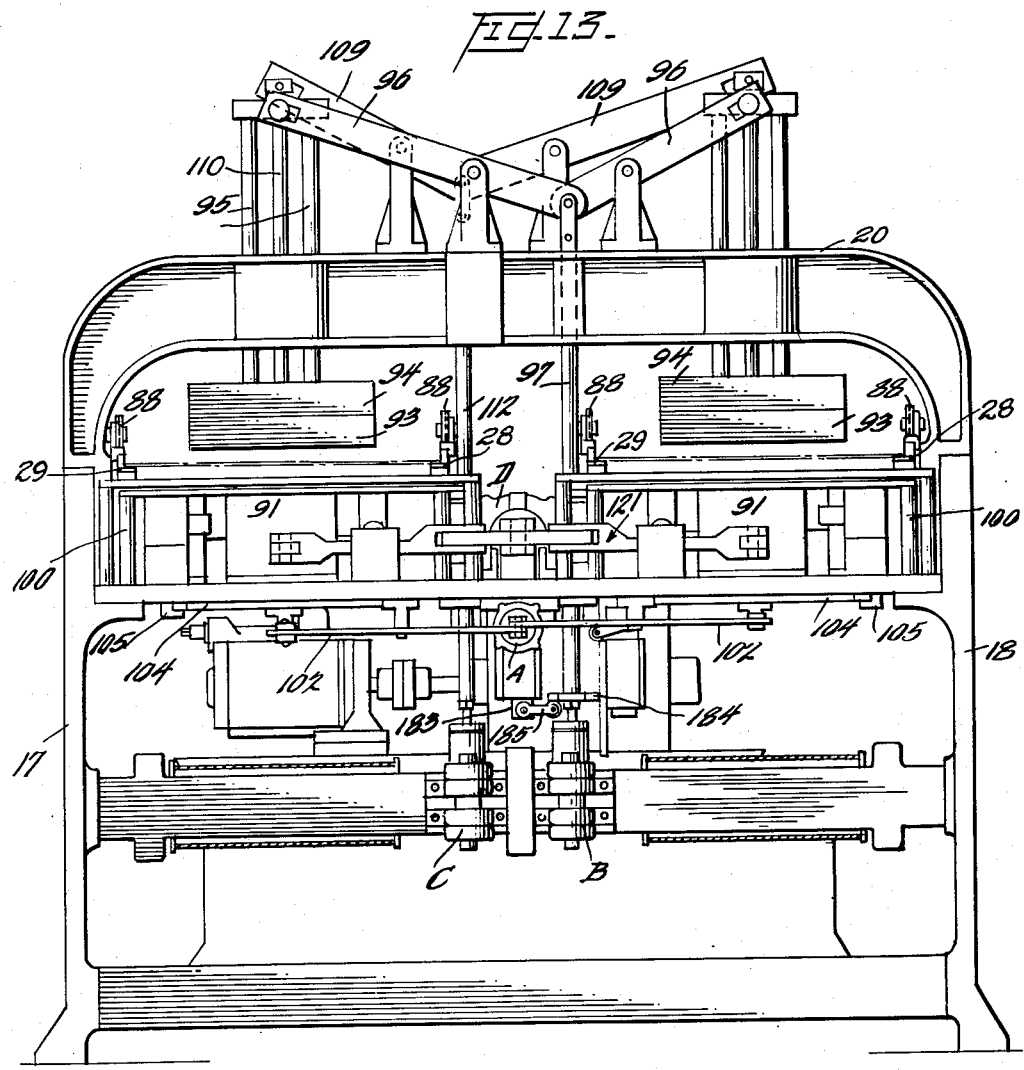
INVENTOR.
Wallace Lindsay
BY
Watson, Cole, Grindle & Watson
ATTORNEYS

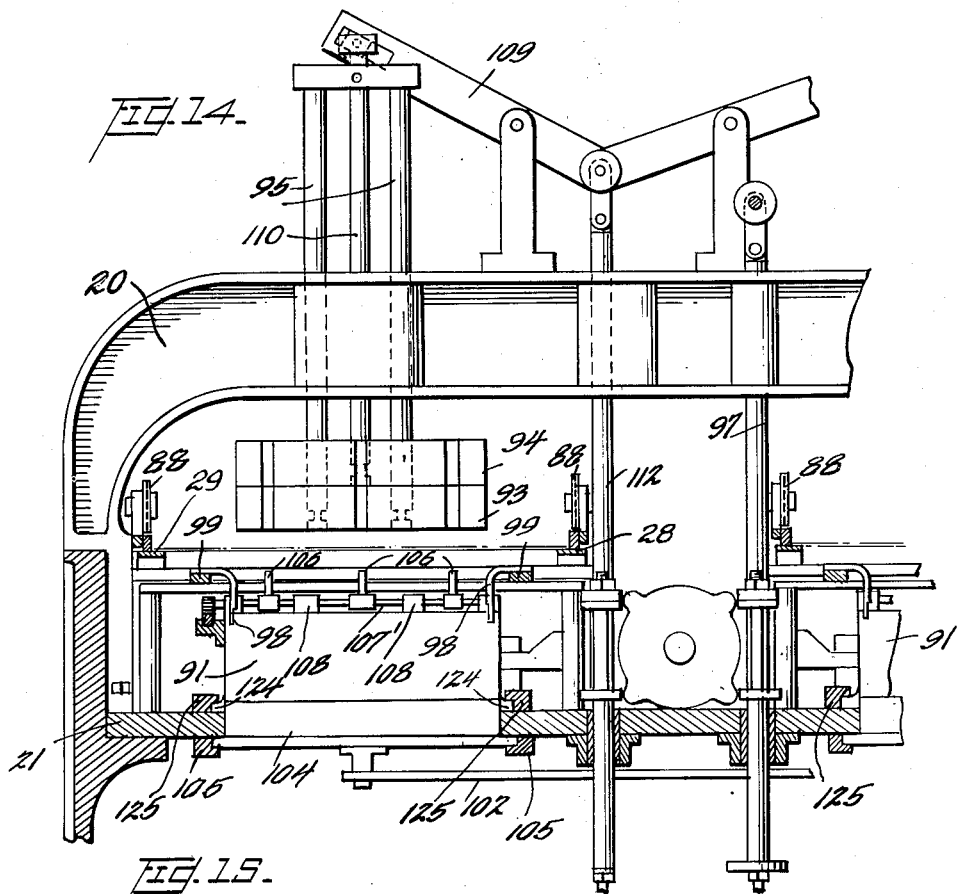
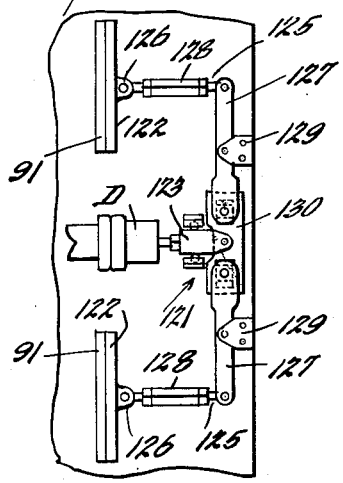
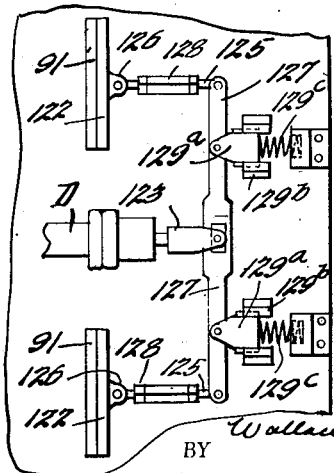

Dec. 9, 1952 W. LINDSAY 2,620,711
HYDRAULICALLY OPERATED DUPLEX BOX MACHINE
Filed July 20, 1949 11 Sheets-Sheet 9
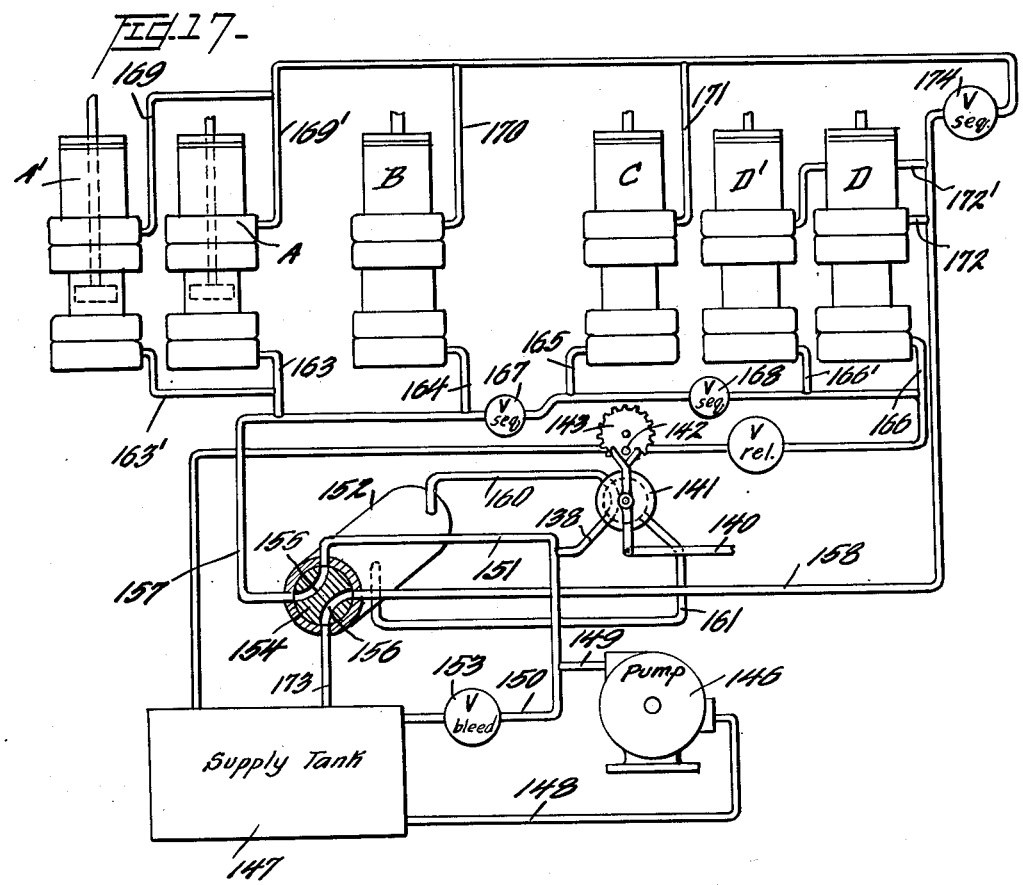
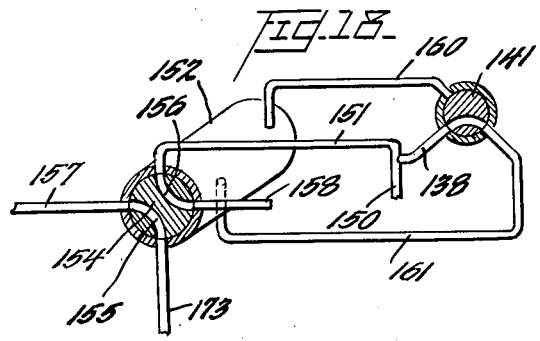
INVENTOR.
Wallace Lindsay
BY
Watson, Cole, Grindle & Watson
ATTORNEYS Dec. 9, 1952 W. LINDSAY 2,620,711
HYDRAULICALLY OPERATED DUPLEX BOX MACHINE
Filed July 20, 1949 11 Sheets-Sheet 10
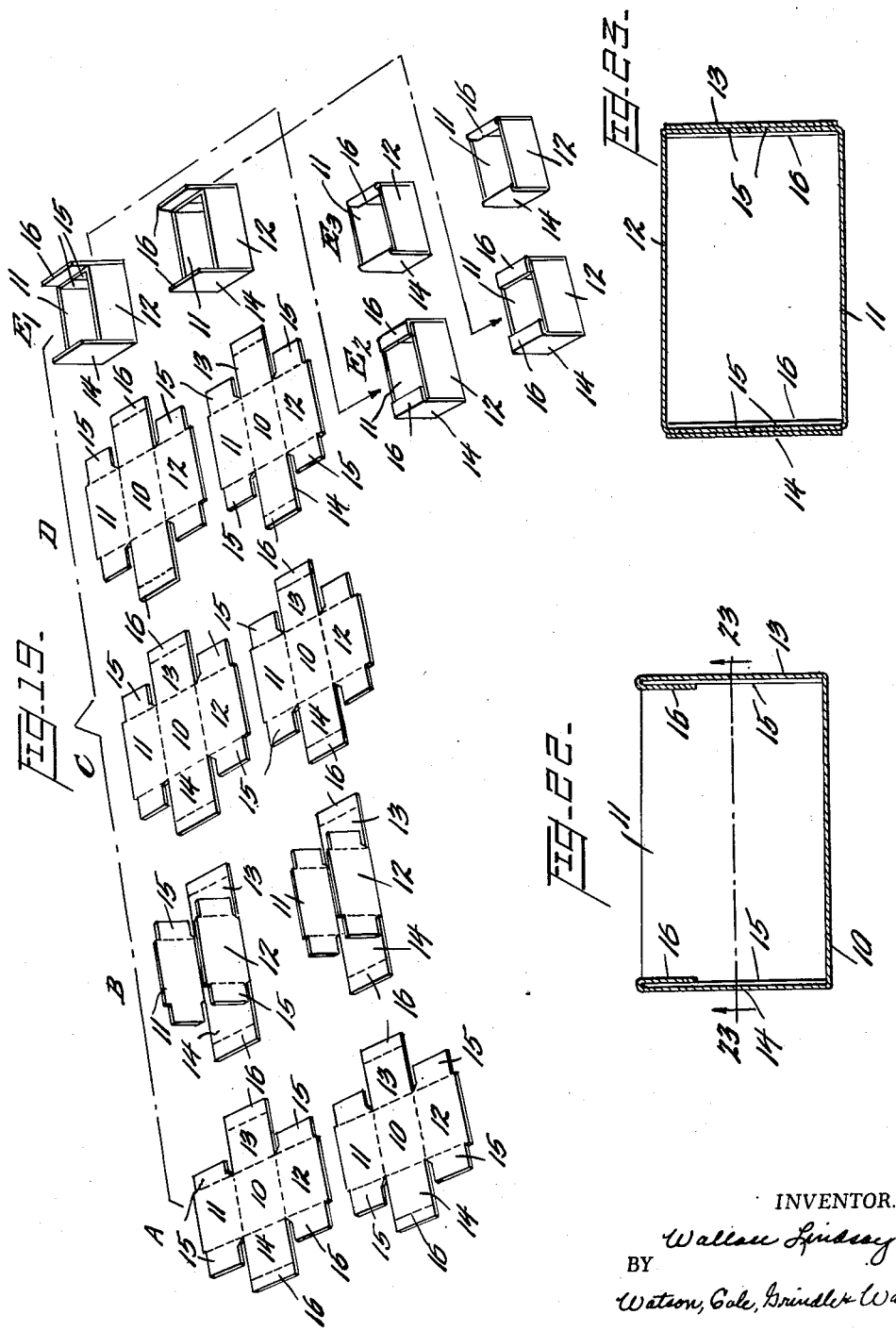
INVENTOR.
Wallace Lindsay
BY
Watson, Cole, Grindle & Watson
ATTORNEYS Dec. 9, 1952 W. LINDSAY 2,620,711
HYDRAULICALLY OPERATED DUPLEX BOX MACHINE
Filed July 20, 1949 11 Sheets-Sheet 11
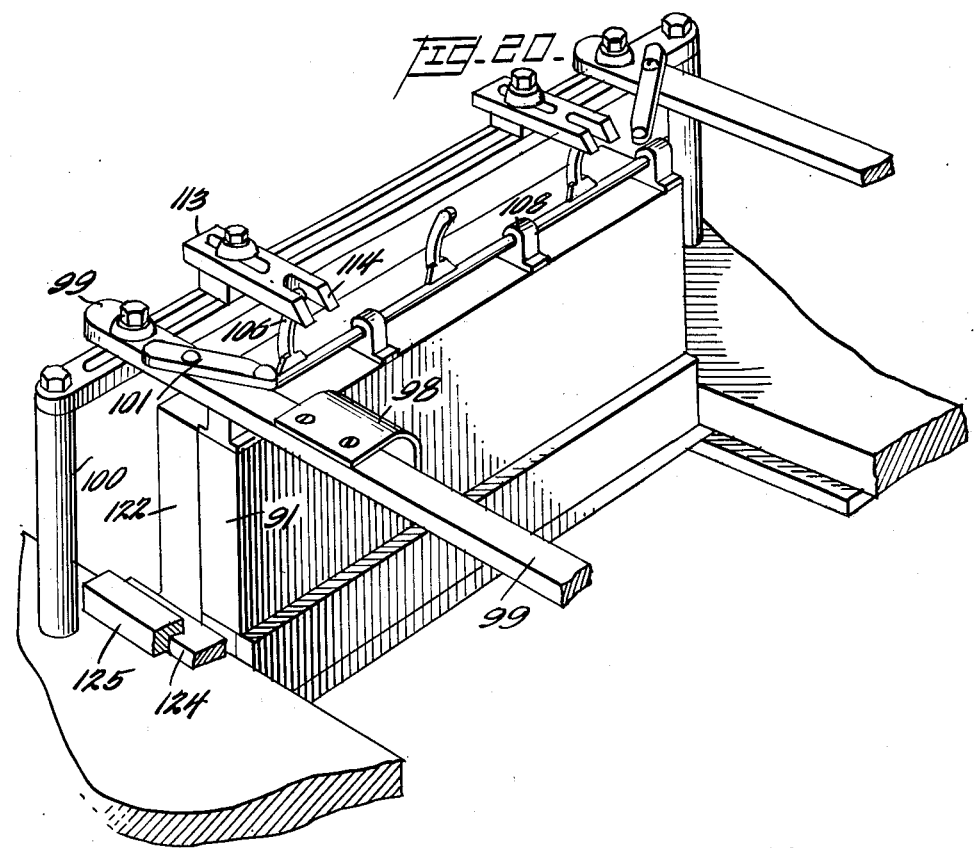
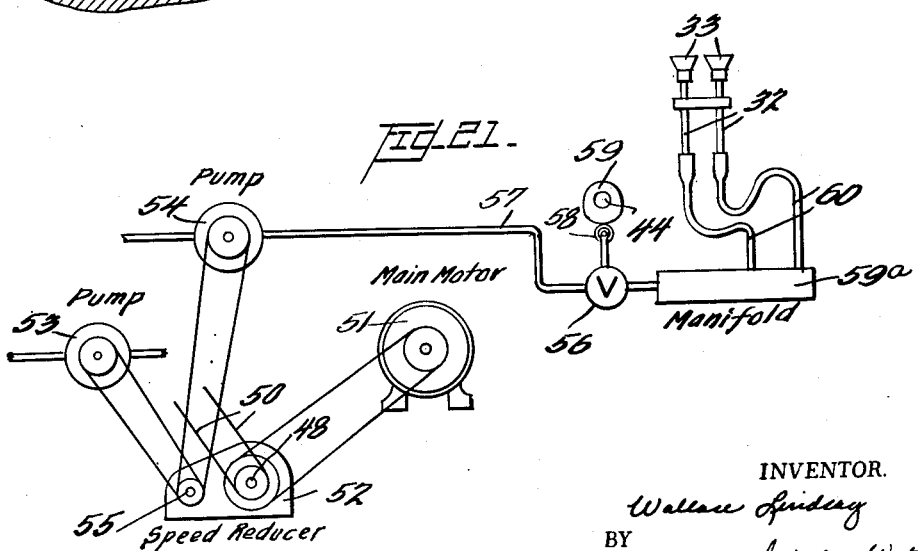
INVENTOR.
Wallace Lindsay
BY
Watson, Cole, Grindle & Watson
ATTORNEYS Patented Dec. 9, 1952

2,620,711

UNITED STATES PATENT OFFICE 2,620,711

HYDRAULICALLY OPERATED DUPLEX BOX MACHINE

Wallace Lindsay, Amsterdam, N. Y.

Application July 20, 1949, Serial No. 105,878

29 Claims. (Cl. 93—51)

This invention relates to automatic box-making machines, and particularly to a box-making machine of the type designed and constructed to receive a succession of single blanks, each such blank being presented first to a gluing means, and thereafter to a forming means, and, upon the completion of the forming operation discharged as a finished box from the machine. The invention more particularly relates to an automatic box-forming machine which comprises two gluing and two forming means arranged to be actuated from a common power source, the arrangement being such that simultaneous box-forming movements are imparted to the corresponding components of the forming mechanisms of the machine.

The moving parts of machines of the type described are generally motivated by means of gearing, or sprocket wheels and chains, which are driven ultimately from a single main power source, and the sequential movement of the component elements of the forming mechanism is generally obtained by means of cam shafts and associated cam followers carried by the moving elements. Box-making machines which are motivated in this manner are generally noisy in operation and difficulties are experienced in providing suitable lubrication for the co-operating cams and followers. Furthermore, in order to change the timing of the sequential movement between the component parts of the forming mechanism of the machine it is necessary to disassemble the machine and replace one set of cams with a set of cams designed to provide the desired alteration in sequential movement of the driven parts. In such an instance, it is, of course, necessary to immobilize the machine for a considerable period of time in order to accomplish the change, and also necessary to manufacture or procure the expensive machined parts necessary to effect the desired change.

In machines of the type described which comprise two production lines which include pressure plates arranged to act against opposite ends of the box form to press adjacent end panels into contact with certain panels to which adhesive has been applied, additional difficulties are encountered in arranging the single cam drive of the pressure plates of both the forming mechanism so that the pressure exerted by the plates on the boxes being formed will be both an effective and constant box-forming pressure. This difficulty results when during the operation of the machine the blank feeding mechanism has failed to position a blank above the forming die of the one line and during a subsequent movement of the pressure plates towards box-forming position the pressure plates of the empty die do not encounter a resistance which will balance the stroke of the pressure plates on the other die until the pressure plates of the empty die have encountered the forming mandrel which moves into the die prior to the stroke of the pressure plates towards box-forming position. In mechanically driven machines this unresisted stroke of the pressure plates in the one production line causes an irregular pressure to be applied to a box contained in the die of the other production line. A similar problem exists when the two line machine has been set up to process blanks which are designed to be formed into the top and bottom of a finished box, respectively. In such instances the blank from which the top of the box is formed may have a thickness substantially less than the blank which is to be formed into the body of the box. Here again, the cam forms necessary to apply the desired pressure to the blank in either production line require replacement of the pressure plate thrust controlling cams with a set of cams which are capable of altering the respective pressure strokes to obtain different length pressure thrusts than are employed when the two production lines are processing blanks of the same thickness. In each of these instances, the difficulty results from the fact that the pressure stroke obtainable by cam action is predetermined by the form of the cam which is ordinarily selected for normal operation of the machine on a particular blank, and consequently is incapable of making automatic adjustments of the pressure stroke to cope with a derangement of the machine as a result of no blanks being fed to one production line or as a result of more than one blank being pressed into the forming die of the one production line, or when blanks of different thickness are supplied to the respective production lines of the machine.

Box-forming machines which utilize cam action to translate the rotary motion furnished by the main power source to a reciprocal motion necessary for the operation of certain components of the forming mechanism are also objectionable with respect to the manner in which the pressure is applied to the blank which has been pressed into the forming die to fix the panels to which the retaining adhesive has been applied to the adjacent parallel panels of the box, and with respect to controlling the speed of operation of the forming mechanism.

It is characteristic of box-forming machines in which the thrust of the pressure plates of the forming mechanism which presses the glued panels of the box against the adjacent parallel panels is cam actuated to effect a hammering action of relatively short duration. Maximum adhesion between the glued panels and the adjacent parallel panels of the box is obtained, however, when the pressure is applied gradually and is sustained for a short period towards the end of a pressure thrust. It is impractical to provide for the application of the fastening pressure in this manner in cam actuated machines at the terminus of various length pressure strokes as would be necessary in order to have effective sealing action accomplished irrespective of whether the forming die of one production line was empty or contained two blanks as a result of a derangement in the operation of the blank feeding mechanism.

It is an object of this invention to provide a hydraulically powered box-forming machine which avoids the disabilities inherent in mechanically driven box-forming machines and at the same time to provide hydraulic means for motivating a box-forming machine which is adapted to permit increased control of the operational speed and adjustments in the timing sequence between the various components of the forming mechanism of the machine.

A further object of the invention is to provide a hydraulic system for powering a box-forming machine in which the sequential movements of the component elements of the forming mechanism may be finely adjusted without the necessity of interchanging working elements in the actuating mechanism thereof. A further object of the invention is to provide an actuating system for a box-forming machine capable of synchronously motivating two parallel production lines and which is capable of applying a predetermined pressure to a blank contained in the one production line irrespective of the presence or absence of a blank in the associated production line.

A further object of the invention is to provide an improved means of delivering individual blanks from a stack of blanks to a conveyor mechanism which is designed to carry the blank through the various stages of the box-forming machine. A further object of the invention is to provide an improved means of releasing blanks from the conveyor and of positioning the blanks in the forming mechanism, and to provide a safety interlock between hydraulically powered and electrically powered components of a box-forming machine which ensures proper sequential operation between the respective components.

Other objects and advantages of the invention will be apparent from the following detailed description which is made with reference to the accompanying drawings.

In the drawings:

Figure 1 is a plan view of a box-forming machine showing the machine in its entirety;

Figure 2 is a plan view of a pilot valve employed to periodically reverse the movements of the forming mechanism;

Figure 3 is a side elevation of the same;

Figure 4 is a side elevation of the machine illustrated in Figure 1;

Figure 5 is a detailed illustration of one stage of movement of the forming head, the forming die and the tucking fingers which cooperate in forming a blank into a box structure;

Figure 6 illustrates a further advanced stage in the box forming movement of the elements shown in Figure 5;

Figure 7 is a longitudinal section along lines 7—7 of Figure 1 through the delivery and gluing end of the machine illustrating in detail the manner in which the delivery and gluing mechanisms are driven from the main power source;

Figure 8 is an end view of the machine showing the blank storage and delivery mechanism;

Figure 9 is a transverse section on the lines 9—9 of Figure 4 illustrating the clutch mechanism interposed between the main power source and the power transmission to the operating mechanism of the delivery and gluing mechanism;

Figure 10 is a longitudinal section along the lines 10—10 of Figure 1 illustrating the forming mechanism of the machine;

Figure 11 is a plan view of the forming mechanism of one production line of the composite machine;

Figure 12 is a section along the lines 12—12 of Figure 11 illustrating the details of the tucking fingers;

Figure 13 is an end view of the machine illustrating the details of the following mechanism;

Figure 14 is a transverse vertical section on lines 14—14 of Figure 11 illustrating in detail the structure and arrangement of the forming plungers and the forming die of one production line of the composite machine;

Figure 15 is a detailed illustration of the construction of the equalizing mechanism employed in conjunction with the pressure plates of the forming dies;

Figure 16 is a modification of the equalizing mechanism employed in conjunction with the pressure plates of the forming mechanism;

Figure 17 is a diagrammatic illustration of the hydraulic actuating system illustrating the connections between the source of hydraulic pressure and the various hydraulically actuated elements comprised in the forming mechanism of the machine in position to move the elements toward box-forming position;

Figure 18 is a schematic diagram of the hydraulic power system control and pilot valve positioned to move the hydraulically actuated elements away from box-forming position;

Figure 19 is a diagram illustrating the condition of blanks passing through the successive stages of the associated production lines of the machine;

Figure 20 is a perspective view of a portion of the machine, showing the relation of the pressure plates, the tucking fingers and the deflecting fingers of one end of a forming die;

Figure 21 is a schematic diagram of the suction system employed with the suckers of the delivery mechanism;

Figure 22 is a section along the longitudinal axis of a box formed from the type of blank illustrated in Figure 19; and Figure 23 is a section along line 23—23 of Figure 22.

This invention is primarily concerned with the application of hydraulic power to a two-production line box-forming machine of the type illustrated in the drawings. The invention is particularly suitable for application to a machine of the type mentioned in which the forming mechanism comprises a contractible and expansible die and an associated forming plunger, which plunger functions to press box blanks delivered to the forming mechanism into the forming die, to position the panels of the box in their final relative relationship, and to thereafter serve as a mandrel against which the pressure plates of the forming die operate to cause the panels to which the adhesive has been applied previously to firmly engage the parallel adjacent panels of the box whereby the box is retained in the desired set-up form. Machines of this nature are provided generally with a set of ledge plates which are associated with each end of the respective forming dies and which plates are caused to move into a box-forming position in which they underlie and support the box blank which is pressed into the forming die by the action of the forming plunger. The forming plunger generally comprises two elements, one being a forming head which reciprocates vertically and which on its downward stroke engages a blank which has been positioned above the forming die and presses the blank into the forming die simultaneously with the movement of the ledge plates of the die into box supporting position. The forming plunger also comprises a forming plate which is caused to move into the forming die and into the box blank contained therein and serve as a mandrel against which the pressure plates of the forming die operate to cause the adhesive engagement of the box panels in set-up position.

It will be apparent that the sequence of motion required for actuating the particular elements of the forming mechanism at the desired time with respect to the associated elements is critical to the efficient operation of a machine of the type described. The invention is particularly applicable to machines which comprise forming mechanisms of the type described above, and which also comprise dual production lines which in a large part may be operated by common actuating mechanism and at the same time arranged so that the production lines are largely independent of one another and a derangement in one production line will not interfere with effective production in the other.

For the purpose of facilitating an understanding of the invention, the invention will be described with reference to a machine in which the blanks supplied to the machine are subjected to the successive stages of production illustrated in Figure 19. The particular portion of the machine in which the successive stages of production represented in Figure 19 are performed are correspondingly indicated in Figure 1.

As is well known, machines of this type may be supplied with blanks of various forms which in general are cut and scored similarly to the blank illustrated in Figure 19 (A). The particular blank illustrated comprises a bottom panel 10, side panels 11 and 12, end panels 13 and 14 and corner flaps 15 formed on the edges of the side panels 11 and 12 respectively. The end panels 13 and 14 are provided with glue flaps 16 which are adapted to be turned back parallel to the end panels into engagement with the flaps 15 as illustrated in Figure 22. To facilitate the forming operation the blanks may be scored or pre-cut on the lines intermediate the panels which are to be folded with respect to each other.

A large number of blanks are placed in the blank rack at the delivery end of the machine from which single blanks are successively withdrawn from the bottom of the stack and deposited upon a conveyor which moves the blanks through the successive positions indicated in Figure 19. The blank which has been withdrawn from the stack by the delivery mechanism and deposited upon the conveyor at the portion of the machine designated A in Figure 1 is in a flat condition as indicated in Figure 19 (A). In the event heavy gauge blanks are employed the forming operation may be facilitated by pre-bending the blank about the score lines prior to delivery of the blank to the forming mechanism.

Where this preliminary working is desirable, the side panels of the blank are engaged by holding bars as the blank is passed through the portion of the machine designated as B in Figure 1 at which position the side panels of the blanks are turned up perpendicular to the bottom panel 10 as indicated in Figure 19 (B). As the blank is passed through the portion of the machine designated at C in Figure 1, the side panels are returned to the plane of the bottom panel 10 to ready the blank for the subsequent application of adhesive to the end panels and the glue flaps at the gluing station designated D in Figure 1 where the blank is passed beneath a gluing roller and adhesive applied to the end panels and glue flaps as indicated in Figure 19 (D). The blank is thereafter released by the main conveyor and engaged by a high speed conveyor which positions the blank over the forming die and beneath the forming plunger of the forming mechanism in the portion of the machine designated as $E_{1, 2, 3}$ in Figure 1. The forming head component of the forming plunger thereupon descends into the forming die and presses the blank into the die and establishes the blank in the condition illustrated in Figure 19 ($E_1$). Thereafter tucking fingers engage the glue flaps 16 and deflect the glue flaps into the position illustrated in Figure 19 ($E_2$) in which position the flaps are in the line of travel of the forming plate component of the forming plunger which thereupon descends into the forming die and turns the glue flaps downwardly into engagement with the turned-in corner flaps 15 as illustrated in Figure 19 ($E_3$). The forming die is subsequently contracted to adhesively fix the box in set-up form, and thereafter expanded to discharge the box from the machine upon a conveyor arranged beneath the forming die.

The various box-forming movements of the components of the forming mechanism are motivated through linkages which connect the corresponding elements of the forming mechanisms of the two production lines to hydraulically actuated elements which in turn are actuated by a common source of hydraulic pressure. The application of the hydraulic pressure to the hydraulically actuated elements to obtain the desired sequential movement of the elements is accomplished by arranging the connections between the source of hydraulic power and the various hydraulically actuated elements in parallel with the source of pressure and by inserting between certain of the connections adjustable pressure resistant devices which serve to delay the application of a workable pressure on certain of the hydraulically actuated elements for a predetermined interval. Further means are provided in the hydraulic power system for adjusting the speed of operation of the forming mechanism cycle as well as adjusting the time of occurrence of the desired sequential movement. One embodiment of the several mechanisms necessary to process a blank in the manner described may comprise the following specifically described instrumentalities.

For the most part the two production lines of the box-forming machine hereafter described are similar in operation and in construction and the description will be made with reference to a single line except in the instances where reference to the two production lines or the manner in which the lines are co-ordinated is necessary for a complete understanding of the operation of the machine. For the most part, the operating parts of the machine are mounted upon or supported on elements mounted upon a rigid frame F which comprises parallel side frame members 17 and 18 formed in sections which permit the machine to be disassembled to facilitate handling and transporting. The frame also comprises a longitudinal member 19 centrally disposed. A transverse member 20 bridges the width of the machine at the box-forming end and supports certain portions of the forming mechanism. A bedplate 21 which extends between side frames 17 and 18 at the forming end of the machine is provided with openings in which the forming dies are arranged and supports various actuating mechanism for the forming dies and the forming plungers.

Blank delivery mechanism

Each production line of the machine is provided with a blank rack which comprises brackets 22 and 23, which span the production line and are fixed at one of their ends to the side frames and at their other ends to the longitudinal frame member 19 as illustrated in Figure 1. The brackets 22 and 23 are provided with longitudinally disposed slots adapted to receive pins extending through the brackets 24 and 25 which extend longitudinally of the machine and are adapted to be slid toward and away from each other on the brackets 22 and 23 in order to make adjustments to accommodate blanks of various sizes in the rack. Upright brackets 26 and 27 (Figure 4) are arranged for sliding movement on transverse bars supported on the brackets 24 and 25 which upright brackets engage the edges of the blanks positioned in the rack and maintain the blanks in position over the delivery mechanism which is arranged beneath the stack and adapted to withdraw a single blank from the bottom of the stack and deposit it on the angle bar channel guides 28 and 29, in which position the blank may be engaged by a lug 30 on the conveyor 31 (Figure 7) which carries the blank to the subsequent operational stages.

The delivery mechanism which is illustrated in Figure 7, comprises suction members 32 which are adapted to reciprocate vertically and to move the suction head 33 arranged thereon into engagement with the bottom blank of the stack of blanks in the rack towards the uppermost limit of the reciprocatory movement. The sucker members 32 are mounted in pairs in a small block 34 which in turn is supported on a rod (not shown) secured to the reciprocating rod 35 which is journalled in the brackets 36. Vertical reciprocatory motion is imparted to the rod 35 by the lever 37 which is pivoted to the depending ear 38 carried on a transom bar 39I. Intermediate the pivot point 38 and the adjustable collar 39 fixed to the rod 35 and pivotedly connected to the bar 37, the bar is provided with a cam roller 40 which is arranged to ride on the internal cam 41 of the sucker cam wheel 42 which is formed eccentrically to rock the lever 37 and thus impart a reciprocatory movement to the rod 35. This structure is illustrated most clearly in Figures 7 and 8 of the drawings. Each production line is provided with two sets of suckers as may be seen by an inspection of Figure 8. The shaft 44 and the cam wheel 42 affixed thereto are driven by a sprocket (not shown) which is connected by means of a chain 45 with a sprocket 46 fixed to the stub-shaft 47 which in turn is driven by the shaft 48 by the sprocket 49 affixed thereto and the chain 50. The shaft 48 is driven by a sprocket and chain connection to the main motor shaft 51 which drives the shaft 48 through the speed-reducer 52. The members 32 of each of the production lines are connected to a separate source of reduced pressure in order to prevent a loss of suction in the one production line from interfering with the normal operation of the delivery mechanism in the other production line. Referring to Figure 21, the sucker members 32 and the sucker head elements 33 are annular in cross-section and the central longitudinal channel thus provided is connected with a zone of reduced pressure which is provided by the suction pumps 53 and 54. The suction pumps are driven by a belt connection to the driven shaft 55 of the speed-reducer mechanism 52. The suction developed by the pump 54 is communicated to the sucker members of the respective production line through an intermittently actuated valve 56 which is connected to the pump by the conduit 57. A similar system is connected to the pump 53 for supplying reduced pressure to the suckers of the other production line. The valves 56 are provided with cam rollers 58 on their valve stems which rollers move in contact with cams 59 fixed to the shaft 44 which also supports the cam wheels 42 which impart the vertical reciprocatory motion to the sucker member assemblies. The configuration of the cam 59 is selected to open the valve 56 to communicate the reduced pressure to the manifold 59a and thence to the sucker members 33 through the flexible conduit 60 as the sucker members are raised upwardly into position to engage the lowermost blank of the stack of blanks supported in the blank rack. The lowermost blank is thus gripped firmly enough to permit the downward movement of the sucker member assembly to buckle the blank slightly and disengage the blank from the blank rack. As the separated blank is lowered into the plane of the channel bar guides 28 and 29 in position to be engaged by the conveyor lugs of the conveyor 31 the configuration of the cam 59 permits the valve stem cam follower 58 to rise sufficiently to cut off the manifold 59a and the sucker members 32 from the source of reduced pressure. The same sequence of operation is repeated throughout the successive cycles of the machine. As shown most clearly in Figures 4 and 7 each blank rack is provided with plates 63 and 64 vertically disposed and arranged to engage opposite sides of a stack of blanks inserted in the blank rack. The plates are provided with numerous short stiff wires 65 arranged generally perpendicular to the plane of the plates 63 and 64 and protruding from the mutually facing surfaces of the plates. As the blanks move downwardly in the stack as a result of successive deliveries of blanks to the machine from the bottom of the stack by the delivery mechanism the ends of the blanks in contact with the plates 63 and 64 are riffled and separated to an extent which permits the delivery mechanism to disengage only a single blank from the bottom of the stack of blanks at each cycle of operation of the delivery mechanism.

As the blanks are lowered into the plane of the channel bar guides 28 and 29 the suction grip of the delivery mechanism is released and the rearward edge of the blank is engaged by one of the dogs 30 of the conveyor 31 which carries the blank through the successive stages of operation indicated by Figure 19 (A), (B), (C) and (D). The channel bar guides 28 and 29 which are adapted to engage the lateral edges of the blanks and guide the movement of the blanks through the successive stages of operation are adjustable laterally with respect to one another on their supporting members thereby permitting blanks of various widths to be handled by the machine.

The main conveyor chains 31 are supported at the delivery end of the machine on sprocket wheels 66 which are carried by the shaft 67 which is journalled in bearings supported on the side frame members 17 and 18 (Figure 7). The forming mechanism terminal of the main conveyor is formed by passing the chain 31 around the sprocket wheel 69 supported on the shaft 70 which in turn is journalled in brackets 71 supported on the bedplate 21 as most clearly illustrated in Figure 10. The tension applied to the main conveyor chains 31 may be adjusted by idler wheels 72 arranged in the manner illustrated in Figure 7, the position of which idlers is largely determined by the location of the various movable elements of the machine which must be cleared by the return strand of the conveyor chain.

Blank working

In the instances where heavy gauge blanks are supplied to the machine it may be desirable to facilitate the forming operation and to insure against tearing of the blanks during the forming operation to preliminarily flex the blank about the score lines between the bottom panel 10 and the side panels 11 and 12. Such a flexing operation may be accomplished in the portions of the machine designated as B and C of Figure 1. This apparatus may consist of restraining rods or wires 73 supported in parallel relationship with the score lines of the blank on the brackets 74 which are fixed at their one end to the side frame member 17 or 18 and at their other end to the longitudinal frame member 19. The brackets 74 are provided with elongated openings which are adapted to receive a pin or bolt secured to the bar or wire 73 which enables the restraining bars to be adjusted laterally with respect to one another to a position which coincides with the score lines of the particular blank being processed. In some instances it may be desirable to extend the restraining wires to a point beyond the gluing station D in order to insure that the blank will not be raised from the channel bar guides and picked up by the gluing roller as the blank is passed through the gluing mechanism. In this instance the surfaces of the co-acting rollers of the gluing mechanism may be provided with circumferential notches through which the restraining bars or wires may be passed without causing the co-acting surfaces of the rollers to be partially disengaged in the vicinity through which the restraining wires or bars have been passed.

As the blank is moved forward into the portion of the machine designated as B in Figure 1 it is moved into position in which the restraining wires 73 overlie the score lines intermediate the bottom and the side panels and the lateral edges of the side panels are moved over the leading edge of the flexing plates 75 supported upon, and arranged for lateral adjustment on, the crosspiece 82 at one of their ends, and the stub supports 83 at the other of their ends. Each flexing plate 75 is turned throughout 180° along its length and as the blank is moved forwardly with the lateral edges in engagement with the flexing bars 75 the side panels are deflected upwardly through a position in which they are normal with respect to the bottom panel 10 as indicated in Figure 19 (B). Further forward movement of the blank causes the flexing bars 75 to deflect the side panels inwardly with respect to each other. At this point in the transit of the blank through the machine the blank is retained in the plane of the channel bar guides 28 and 29 by the supporting bars 76 arranged longitudinally with respect to the machine and spaced to support the box in its flexed position. The supporting bars may be extended the length of the machine to prevent the center portion of the blanks being processed from sagging and thereby causing their lateral edges to become disengaged from the channel bar guides.

The flattening cams 77 in the section of the machine designated C in Figure 1 engage the inner surfaces of the side panels as the blank is moved forwardly towards the gluing mechanism and deflect the side panels outwardly away from one another into parallelism with the bottom panel 10 of the blank, as illustrated in Figure 19 (C) immediately prior to the delivery of the blank to the gluing mechanism indicated generally at G in Figure 1.

Gluing mechanism

The gluing mechanism may be of any well known type and in the embodiment illustrated in Figures 4 and 7 and described herein consists essentially of an applying rolller 78 and a counter roller 79 which is driven by a sprocket and chain connection to the shaft 47 as illustrated in Figure 4. The gluing mechanism is also provided with a glue pot 80 and a glue roller 81 arranged to apply a suitable adhesive contained in the glue pot 80 to the applying roller 78, the latter roller applying the adhesive to the blank as the blank is carried between the rollers 78 and 79. The surfaces of the rollers 78 and 79 may be provided with notches shaped to freely pass the conveyor chain and conveyor lug as well as the restraining wires as previously described to facilitate passing the blank through the gluing station without interfering with the firm engagement between the surfaces of the rollers 78 and 79 necessary to insure the application of a sufficient amount of adhesive to the end panels and glue flaps of the blanks.

Blank positioning

As the blank is moved toward the forming mechanism, the portion of the machine designated as E in Figure 1, the lateral edges of the blank which are riding in the channel bars 28 and 29 ride up the leading beveled edge of a bar 86, the trailing edge of which may be seen in Figure 10, and the blank is thereby raised into position in which the dog 87 of the high-speed conveyor 88 may engage the rearward end of the blank. The blank is thus moved forwardly towards the forming mechanism at an increased rate of speed and as the rearward edge of the blank passes downwardly along the trailing beveled edge of the bar 86, which bar is positioned on the inwardly extending flanges of the angle bar channel guides 28 and 29, the dog 87 becomes disengaged from the rearward edge of the blank and the blank is impelled forwardly until the leading edge of the blank strikes against the stop 89. The stop 89 may be adjusted in position relative to the forming die of the forming mechanism whereby blanks of various sizes and shapes may be stopped in proper relationship to the forming die for the subsequent box-forming operations. The blank thus delivered is interposed between the forming die and the forming plunger of the forming mechanism as illustrated in Figure 14, the lateral edges of the blank being positioned and supported by the channel bar guides 28 and 29.

The forming mechanism

The constructions of the various elements of the forming mechanism are illustrated in various degrees of particularity in Figures 5, 6, 10, 11, 12, 13, 14, 15, 16 and 20. In general, the forming mechanism comprises a forming plunger and a cooperating forming die which during the operational cycle of the machine contracts to a box-forming position to adhesively fix the box in set-up condition, and subsequently expands permitting the finished box to drop from the bottom of the forming die.

Referring particularly to Figure 10 it will be seen that the forming die of one production line comprises oppositely disposed and mutually facing pressure plates 91 which are arranged for sliding movement towards and away from one another, and ledge plates 92 which are adapted to move inwardly in relation to one another and underlie a blank which is pressed into the die by the plunger mechanism. The plunger mechanism comprises a forming head 93 and an associated actuating mechanism, and a forming plate 94 with a corresponding actuating mechanism for moving the elements of the forming plunger into the forming die in a timed relationship and particular sequence. The manner in which the various component elements of the forming die and the forming plunger are actuated will be described in more detail in connection with the hydraulic power system employed to motivate the forming mechanism of the machine.

In operation, the blank which has been positioned over the forming die as aforesaid is pressed into the die by the downward movement of the forming head 93 into the forming die. As may be seen from an examination of Figure 13, the vertical reciprocatory movement of the forming head is obtained by the linkage comprising rods 95 guided in openings provided in the bridge member 20 and the bar 96 connected to the piston rod 97 also guided in the bridge member 20 which rod in turn is actuated by the hydraulically actuated element B which in this instance comprises a cylinder and a piston working therein to which the rod 97 is rigidly affixed. The reciprocatory movement of the rod 97 which is followed by the rods 95 connected to the forming head is obtained by selectively admitting pressure to one or the other side of the piston working in the cylinder B. The manner in which the sequential movement between the various component parts of the forming plunger and the forming die is obtained will be more fully described in connection with the hydraulic power system. As the forming head moves downwardly into the die the lower face of the forming head engages the upper surface of the blank disposed across the die and presses the blank downwardly into engagement with the ledge plates 92 which have been moved to box supporting position in which they underlie and support the blank simultaneously with the movement of the forming head into the die.

The sides of the die are provided with turning plates 98 which are arranged on laterally adjustable bars 99 which are in turn supported on a cross-piece carried on the stubs 100 fixed to the bedplate 21 as shown most clearly in Figures 11 and 20. The positions of the bars 99 are adjusted laterally so that the turning plates 98 fixed to either side of the die will engage the blank being pressed into the die slightly outwardly of the score line between the bottom panel 10 and the side panels 11 and 12, whereby a smooth entry of the blank into the die will be effected. The die is also provided with deflecting fingers 101 secured to the bars 99 and adapted to engage the flaps 15 of the blank and deflect the flaps inwardly as the blank is pressed into the die. At the completion of the movement of the forming head into the forming die the blank is in the condition illustrated in Figure 19 (E₁) in which the flaps 15 lie parallel and adjacent to the end panels 13 and 14 which have been turned up normal to the bottom panel 10. The ledge plates 92 have moved inwardly and underlie and support the box form. The ledge plates 92 are moved into the described box-forming position by the actuating linkage 102 connected to the ledge plates and to the piston rod of a hydraulically actuated element A as illustrated in Figure 13. The linkage 102 comprises a turn-buckle 103 (Figure 10) whereby the stroke of the ledge plates towards box-forming position may be adjusted to accommodate blanks of various sizes and forms. The ledge plates are interchangeable, and a plate having a height suitable to the depth of the box which is to be formed may be substituted as necessary. The interchangeable portion of the ledge plate is carried on the mutually facing edges of plates 104 which are supported and guided by the guide elements 105 fixed to the under portion of the bedplate 21 as shown most clearly in Figure 14.

Subsequent to the movement of the forming head into the forming die the downward movement of the forming plate towards the forming die is initiated. The initial movement of the forming plate actuating mechanism causes the tucking fingers 106 which are fixed to the shaft 107 journalled in the bearings 108 supported on the face plates of the pressure plates 91 (Figure 20) to rotate towards the center of the forming die and engage the glue flap 16. The glue flap 16 is thus deflected to the position indicated in Figure 19 (E₂) in which position it lies in the path of the forming plate 94 which is ready to descend into the forming die. The glue flap 16 is thus turned downwardly to overlie the flaps 15 which have previously been deflected to a position in which they lie parallel and adjacent to the end panels 13 and 14. The foregoing is most clearly shown in Figures 5 and 6.

The reciprocatory motion of the forming plate 94 is obtained through actuating linkage 109 connected to the rod 110 which is fixed to the forming plate and guided in openings provided in the bridge element 20 and fixed to the piston rod 112 of a hydraulically actuated element C as illustrated in Figure 13. The reciprocatory motion imparted to the forming plate is obtained in a similar manner to that described in connection with the forming head and the hydraulically actuated element associated therewith.

As shown in Figure 20 the ends of the forming dies may be provided with bifurcated deflecting elements 113 having beveled edges 114 which are adapted to engage the under side of the blank outwardly of the score lines between the bottom panel 10 and the end panels 13 and 14 to facilitate a smooth entry of the blank into the forming die. The tucking fingers 106 may be arranged along the shaft 107 between the forks of the turning elements 113 as illustrated in Figure 20.

One arrangement whereby the tucking fingers may be caused to operate immediately prior to the descent of the forming plate into the die is illustrated in Figure 12. One end of the shaft 107 on which the tucking fingers are secured is provided with a pinion 115 which engages a rack 116 formed on the bar 117 which is connected to a plunger 118 operating in a solenoid 119. The solenoid may be controlled, and the plunger 118 caused to reciprocate within the coil of the solenoid by a two-way switch controlled by the initial movement of the actuating mechanism of the forming plate. A second rack 120 is formed on the bar 117 and engages the pinion 115' fixed to the shaft 107' carried by the other end plate of the forming die. The racks 116 and 120 are arranged to engage diametrically opposite portions of the pinions 115 whereby a stroke of the rod 117 in the direction indicated by the arrow in Figure 12 will cause the tucking fingers supported on the oppositely disposed pressure plates to move towards each other and engage the glue flaps 16 of the blank which are thereupon deflected into the path of the descending forming plate. The lateral edges of the forming plate may be provided with notches arranged to coincide with the position of the tucking fingers to permit the forming plate to engage the glue flap 16 which has been deflected into the path of movement of the forming plate by the tucking fingers and at the same time to pass clear of the tucking fingers which are also extended into the path of movement of the forming plate in its descending movement. It is apparent that the reciprocating movement of the bar 117 may be accomplished equally well by providing a mechanical connection between the actuating mechanism of the forming plate and the bar 117.

At the terminus of the movement of the forming plate into the forming die the blank has been set up within the die as indicated in Figure 19 (E₃), the ledge plates 92 underlie the ends of the box structure and the forming head and forming plate are positioned within the box to serve as a mandrel against which the pressure plates may operate in the subsequent stage of the forming operation to adhesively fix the box in the form indicated in Figure 19 (E₃) as a result of pressing the glued inner surface of the panels 13 and 14 against the adjacent parallel flaps 15 and the glue flaps 16 to the top margins of the panels 15.

The pressure plates in both production lines are moved towards each other to accomplish the box fixing step by means of a linkage indicated generally at 121 in Figures 11 and 15 which is fixed at one end to the back plate 122 of the pressure plates and through intermediate connections to the piston rods 123 and 123' of the hydraulically actuated elements D and D'. The corresponding pressure plates of the two production lines are actuated by means of the same hydraulically actuated elements D and D'. As will hereafter be described in more detail, both the hydraulically actuated elements indicated as D and D' are operated simultaneously by a single connection to a source of hydraulic pressure. The backing plate 122 of the pressure plate assembly is provided with a ledge flange 124, seen most clearly in Figure 20, which is adapted for sliding movement in the guide 125 formed on the bedplate 21 along the lateral edges of the die openings provided in the bedplate.

Referring to one end only of the similarly constructed ends of the forming mechanism illustrated in Figures 11 and 15, the actuating mechanism connecting the pressure plates to the hydraulically actuated element D comprises a pitman 125 pivoted at one end to an ear 126 formed on the rearward side of the backing plate 122 and at its other end to the lever 127. Intermediate the ends of the pitman 125 a turnbuckle 128 is provided which permits adjustment of the working stroke of the pressure plates.

The lever 127 is pivoted intermediate its ends to the fixed abutment 129 and pivotedly connected at its other end to the pivot plate 130 which in turn is pivoted to the end of the piston rod 123 of the hydraulically actuated element D.

Figure 16 illustrates a suitable alternative construction of the pressure plate actuating mechanism in which the pivot plate 130 is replaced with pin and slot connections between the rod 123 and the levers 127, and the fixed abutments 129 to which the levers 127 are fulcrumed are replaced by the abutments 129a which are adapted to slide in the guide-ways 129b against the force of the springs 129c when the force applied to the linkage through the rod 123 overcomes the force of the springs. The resistance offered by the springs 129c is selected so that the abutments 129a are held against movement during normal operation of both production lines of the machine.

Actuating mechanism thus arranged in conjunction with the hydraulically actuated element D results in a uniform pressure being applied to the box assembly in the forming dies of either production line irrespective of the presence of more than one blank in one of the production lines. Similarly, the normal pressure will be applied through the pressure plates to the blanks in the forming die of one line even though the forming die of the other production line is empty. This results from the action of the hydraulically actuated element in continuing the thrust of the piston rod 123 until an equalizing resistance is encountered irrespective, insofar as the travels here dealt with are concerned, of the distance through which the thrust member 123 is moved before the resistance is encountered. This involves considerable advantages over mechanisms in which the stroke of the actuating thrust member is predetermined by the configuration of the actuating cams and which consequently are incapable of automatic variations in the length of the pressure stroke which make it possible to apply a uniform pressure to each of the two production lines irrespective of a derangement in the blank feeding operation of one of the production lines. A further advantage accruing from the operation of the pressure plates of the forming die in the manner described is obtained as a result of the squeezing action of the hydraulically actuated unit which results in superior adhesion between the glue flaps and the adjacent parallel panels, as contrasted to the force suddenly applied and removed in hammer-like action by cam actuated pressure plates.

The face plate 91 of the pressure plate assembly is detachably secured to the backing plate 122 and may be interchanged with plates of different vertical height to complement the various sizes of ledge plates which are employed in arranging the machine to act on blanks which are cut to form boxes of various depths.

It will be apparent from the foregoing description that the corresponding elements of the forming mechanism of each production line are actuated simultaneously and in the same sequence with respect to the other elements of the mechanism. For example, vertical reciprocatory motion of the piston rod 112 of the hydraulically actuated element C will cause simultaneous reciprocatory motion of the forming plates 94 of both production lines, and reciprocatory movement of the rod 97 of the hydraulically actuated element B will cause simultaneous reciprocatory movement of the forming heads 93 in both production lines. The ledge plates 92 oppositely disposed at either end of both forming dies are simultaneously actuated in both production lines by the hydraulically actuated elements A and A' which are associated with the corresponding ledge plates in each production line by means of a single connection from the source of hydraulic power to both of the hydraulically actuated elements A and A'. The pressure plates in both production lines are similarly operated simultaneously by means of a common connection from the source of hydraulic power to the hydraulically actuated elements D and D'.

The return movement of the working parts of the forming mechanism is accomplished by admitting hydraulic pressure to the hydraulically actuated elements which motivate the respective parts on the opposite side of the pistons of the respective elements from which the pressure was admitted to cause the working parts to move in the box-forming direction. The manner in which the application of pressure to certain of the hydraulic elements is delayed in order to effect the desired sequence of return movement of the various working parts of the forming mechanism will be described more particularly in connection with the hydraulic power system. In general, however, this arrangement is such that the forming die is first expanded by the retraction of the pressure plates from box-forming position and thereafter the ledge plates and the forming head and forming plate of the plunger are returned simultaneously to their initial position to complete the box-forming cycle. The return movement is initiated at the end of the box-forming stroke of the pressure plate by means of a lever 140 which is pivoted at one end to the piston rod 123' of the hydraulically actuated element D' and fulcrumed in a manner which causes the free end of the lever to engage and operate a pilot valve 141 which effects the transfer of the hydraulic pressure of the hydraulic power system from the forming direction side of the pistons of the hydraulically actuated element to the return movement side of the pistons. The construction of the pilot valve and the manner in which it is operatively engaged by the lever 140 is shown most clearly in Figures 2, 3 and 17. At the end of the return movement of the working parts of the forming mechanism the box-forming cycle is again initiated by the return of the pilot valve to its initial position by a lug 142 carried on the periphery of the gear wheel 143 supported in mesh with the pinion 144 which is fixed to one end of the shaft 70. The shaft 70 is driven by the conveyor chain 31 by means of the sprocket wheel 69 (Figure 10) fixed thereto, and the rate at which the forming mechanism is cycled may be determined in part by the gear ratio established between the gears 143 and 144. The rate at which the forming mechanism is cycled is related to the speed at which the conveyor is run so that the plunger is returned to its initial position prior to the delivery of the successive blanks to the forming mechanism. The manner in which the timing between the delivery of the blanks to the forming mechanism and the return movement of the working parts of the forming mechanism may be finely adjusted will be described hereafter in connection with the hydraulic power system.

The hydraulic power system

One embodiment of a hydraulic system which may be employed to motivate the forming mechanism according to the invention is illustrated diagrammatically in Figure 17. A hydraulic pump 146 driven by the main motor is connected to a supply of hydraulic fluid 147 by the conduit 148 and the fluid picked up by the pump from the supply is delivered under pressure from the discharge side of the pump to the conduit 149 which has two branches, a branch 150 connected to the fluid supply source 147, and a branch 151 which conducts the fluid under pressure to the control valve 152. The branch 150 is provided with a bleeder valve 153 which acts as an adjustable restriction in the branch 150 whereby various amounts of the fluid under pressure may be bypassed to the supply tank or the output of the pump may be diverted entirely into the branch 151 connecting to the control valve 152. In the instance the pump 146 is the constant speed type the effective output of the pump may be varied by returning a portion of the output to the supply tank through the valve 153 whereby the rate of movement of the hydraulically actuated elements associated with the system may be varied.

The control valve 152 is provided with two outlets for the fluid under pressure delivered to the valve by the hydraulic pump, the valve being provided with a channelled core or other suitable means for communicating the fluid pressure to the one outlet and closing off the other and establishing a return circuit for the fluid in the system displaced by the admission of the fluid under pressure in either instance. In the illustrated embodiment the control valve 152 is shown as comprising a rotatable core 154 provided with channels 155 and 156. The core 154 of the control valve is caused to rotate, or slide according to the type of valve employed to connect the source of fluid pressure to the conduit 157 or 158 corresponding to the setting of the pilot valve 141 which directs the fluid under pressure supplied to the pilot valve through the conduit 138 to the conduit 160 or 161 which in turn causes the movement of the core to the position in which the fluid pressure is applied to either the conduit 157 or the conduit 158. As previously explained, the pilot valve 141 is cycled between its two settings by the action of the lever 140 at the terminus of the box-forming stroke of the pressure plates and by the lug 142 carried on the periphery of the gear 143.

In the system illustrated in the accompanying drawings the box-forming movement of the working parts of the forming mechanism is effected when the valve core 154 is in the position illustrated in Figure 17 in which the fluid pressure supplied to the control valve is communicated to the conduit 157. The hydraulically actuated elements A, A', B, C, D and D' which motivate the ledge plates, the forming heads, the forming plates, and the pressure plates, respectively, are connected to the source of hydraulic pressure through the conduit 157 in parallel relation by the conduits 163, 163', 164, 165, 166 and 166', respectively, when the pilot valve 141 and the control valve 152 are in the condition illustrated in Figure 17. The hydraulic fluid pressure developed by the pump 146 is applied through the conduits 149, 151, 155, 157, 163, 163' and 164 to the lower side of the pistons of the hydraulically actuated elements A, A' and B simultaneously, which elements motivate the ledge plates and the forming heads of the forming mechanism simultaneously and cause the forming head to move downwardly into the forming die and the ledge plates to move into box-forming position in which they underlie the blank pressed into the forming die by the downward movement of the forming head. A spring balanced adjustable valve 167 is interposed in the conduit 157 between the parallel connections 164 and 165 to the forming head hydraulically actuated element and the forming plate hydraulically actuated element respectively. The resistance to fluid pressure offered by the valve 167 is such that the valve will not open until the pistons of the hydraulically actuated elements A, A' and B have moved to the end of their box-forming stroke. When the pistons of the elements A, A' and B have reached the end of their stroke the fluid pressure builds up against the valve 167 sufficiently to open the valve and permit the pressure to be applied through the conduit 165 to the hydraulically actuated element C, which as previously explained imparts the vertical reciprocatory movement to the forming plates of the plunger. The resistance of the valve 167 to the fluid pressure is adjusted to cause the desired delay between the end of the stroke of the piston of the hydraulically actuated element B and the initial movement of the piston of the element C which causes the forming plates of the mechanism to descend into the die in the manner previously specified. A second adjustable resistance valve 168, hereafter referred to as a sequence valve, is interposed in the conduit 157 between the parallel connection 165 to the hydraulically actuated element C and the connections 166 and 166' to the elements D and D'. The valve 168 performs a function similar to that of the valve 167 in determining the interval between the end of the working stroke of the piston of the element C and the initial movement of the pistons of the elements D and D' which actuate the pressure plates and cause the oppositely disposed pressure plates of the two forming dies to move towards each other into box-forming position.

The fluid contained in the hydraulically actuated elements on the side of the piston opposite from that to which the pressure is being applied is displaced through the parallel connections 169, 169', 170, 171, 172 and 172' into the conduit 158 through which it flows to the channel 156 of the valve core to the conduit 173 connected to the supply tank 147.

At the end of the box-forming strokes of the elements D and D' which are the last movements in the box-forming sequence, the lever 140 is operatively engaged by the piston rod of the element D' and causes the pilot valve to be shifted to the position illustrated in Figure 18 in which the fluid pressure applied through the conduit 158 to the pilot valve is diverted through the conduit 161 and causes the valve core to rotate or slide to the position indicated in Figure 18 wherein the source of hydraulic pressure is applied through the conduit 149, 151 and the channel 156 of the valve core to the conduit 158. The hydraulic pressure source is thus immediately connected to the return side of the piston of the elements D and D' through the parallel connections 172 and 172', whereby the return movement of the pressure plates actuated by the elements D and D' is initiated. An adjustable resistance sequence valve 174 is interposed in the conduit 158 between the parallel connections 172 and 172' to the elements D and D' and the connection 171 to the element C, and the resistance offered to the fluid pressure by the valve 174 is sufficient to resist opening the valve 174 until the return strokes of the pistons of the elements D and D' are completed and the pressure plates actuated thereby have been retracted to their initial positions. Thereafter, the pressure in the line 158 builds up sufficiently to overcome the resistance offered by the valve 174 and the fluid pressure is applied simultaneously to the hydraulically actuated elements A, A', B and C thereby causing the simultaneous return movement of the ledge plates, the forming heads, and the forming plates, to their initial positions. The completed box thereupon drops from the die, and may be received upon a conveyor arranged beneath the die for delivery to any desired location. The fluid displaced from the hydraulically actuated elements by the return movement of the pistons therein is forced through the parallel connections 163, 163', 164, 165, 166 and 166' into the conduit 157 which returns the fluid to the supply tank 147.

The described cycle of operation is automatically repeated as the lug 142 and the lever 140 alternately shift the pilot valve between its two described positions whereby the control valve is automatically actuated to alternately connect the source of fluid pressure to opposite faces of the pistons of the hydraulically actuated elements whereby a reciprocatory movement of the working parts of the forming mechanism actuated by the elements is obtained.

It will be apparent from the foregoing description that the time of sequential movement of the hydraulically actuated elements may be varied by appropriate adjustment of the sequence valves interposed between the elements to cause an adjustable delay of the application of a working pressure to the element or elements connected more remotely from the source of hydraulic pressure.

It will be understood that the invention may be employed with machines utilizing a greater or lesser number of hydraulically actuated elements and that various types of fluid resisting elements may be employed to obtain the sequential movement between the hydraulically actuated elements, and that minor variations and changes may be made in the means for connecting the hydraulically actuated elements to the source of fluid pressure without departing from the scope of the invention.

In the box-forming machine herein described the forming mechanism is hydraulically powered and the preceding stages of the machine including the blank delivery mechanism and the gluing mechanism are driven by the main motor through the described power transmission mechanism. If the machine is operated continuously over a long period of time the independently powered stages of the machine may drift out of phase and cause an unnecessary loss of blanks as a result of the blanks being only partially positioned over the forming die at the time the forming head descends into the die. Such an operational derangement may be avoided by providing an interlocking system between the forming mechanism which is essentially hydraulically powered and the preceding stages of the machine which are electrically driven. In the box machine illustrated, this interlocking system comprises two switches in the main motor power supply line interconnected so that the power source to the main motor is interrupted only when both of the switches are open, the one switch arranged to be periodically opened and closed by a cyclical movement of one of the working parts of the stages of the machine which is electrically powered, the other switch being arranged to be periodically opened and closed by the cyclical movement of a working part in the hydraulically powered stage of the machine. The operation of the switches is arranged to occur so that either one or the other of the switches will be closed to complete the power connection to the main motor when the electrically driven and the hydraulically driven stages of the machine are in proper phase relationship. In the event the timing between the differently powered stages of the machine is improperly adjusted both switches will be in their open positions simultaneously and the power supply to the main motor will be interrupted thereby causing the entire machine to stop.

In the illustrated embodiment the switch 180 which is associated with the electrically driven stages of the machine is positioned immediately beneath the cam 181 carried on the shaft 182 which also supports the counter-roller 79 of the gluer G as may be seen from an inspection of Figure 4. The switch 180 is normally open and is moved to its closed position when the raised portion of the cam 181 rides over the cam roller provided on the switch arm of the switch 180 which action occurs for only a short interval during each complete revolution of the cam. The switch 183, shown most clearly in Figure 13, is associated with the piston rod of the hydraulically actuated element B and is normally closed. As the forming heads are caused to move towards box-forming position a collar 184 secured to the piston rod 112 permits the switch arm 185 to move upwardly and open the switch. The configuration of the cam 181 which controls the switch 180 associated with the electrically driven stages of the machine is selected so that the switch 180 is closed during the interval when the normally closed switch 183 is open and the electrically driven and the hydraulically driven stages of the machine are in proper operational phase.

It will be understood that the detailed description made with reference to a single embodiment of the invention for the purpose of facilitating an understanding of the invention is not intended to limit the scope of the invention otherwise than set out in the appended claims, and that minor changes in the construction of the machine may be effected without departing from the import of the invention, as will be appreciated by those skilled in the art.

Having thus described the invention, what I claim as new and desire to secure by Letters Patent is:

1. A box-forming machine comprising two forming mechanisms, said mechanisms including contractible and expansible dies, each of said dies having two pressure plates mutually facing and oppositely disposed and arranged for relative movement toward and away from one another, a source of hydraulic pressure, actuating mechanism including hydraulically actuated elements connected to the corresponding plates of each said die for causing said relative movement, and means connecting said source of hydraulic pressure to said hydraulically actuated elements for simultaneously actuating the two said forming mechanisms.

2. A box-forming machine according to claim 1 which includes an adjustable bleeder valve in said connecting means between said hydraulically actuated elements and said source of hydraulic pressure, whereby the rate of said relative movement of said plates may be regulated.

3. A box-forming machine comprising two forming mechanisms, said forming mechanisms including contractible and expansible dies, each of said dies having two pressure plates mutually facing and oppositely disposed and arranged for relative sliding movement toward and away from one another, and two slidable ledge plates adapted for relatively slidable movement to a supporting position for paper blanks pressed into said die; a source of hydraulic pressure, actuating mechanism including hydraulically actuated elements connected to the corresponding pressure plates and slidable ledge plates of each said die for causing said relative sliding movements, and means connecting said source of hydraulic pressure to said hydraulically actuated elements for simultaneously actuating the two said forming mechanisms.

4. A box-forming machine comprising two forming mechanisms, said forming mechanisms including contractible and expansible dies, each of said dies having two pressure plates mutually facing and oppositely disposed and arranged for relative sliding movement toward and away from one another, and two slidable ledge plates adapted for relatively slidable movement to a supporting position for paper blanks pressed into said die; a source of hydraulic pressure, actuating mechanism including hydraulically actuated elements connected to the corresponding pressure plates and slidable ledge plates of each said die for causing the said relative sliding movements of the plates, and means connecting said source of hydraulic pressure to said hydraulically actuated elements for simultaneously actuating the two said forming mechanisms, said connecting means comprising a conduit connecting both said hydraulically actuated elements in parallel with said hydraulic pressure source, and a valve having an adjustable resistance to hydraulic pressure interposed in said conduit between said hydraulically actuated elements, whereby the time of sequential movements of said hydraulically actuated elements may be adjusted.

5. A box-forming machine according to claim 3 wherein an adjustable bleeder valve is interposed in said connecting means between the said hydraulically actuated elements and said source of hydraulic pressure, whereby the rate of sliding movement of all said plates may be regulated.

6. A box-forming machine comprising a forming plunger and a cooperating expansible and contractible die in combination with a source of hydraulic pressure, hydraulically actuated elements, actuating mechanism operatively connecting said elements to said die and plunger, and means connecting said elements to said pressure source for actuating and co-ordinating the box-forming movements of said plunger and die.

7. A box-forming machine comprising a forming plunger and a cooperating expansible and contractible forming die, said plunger comprising a forming head and a forming plate, said die comprising mutually facing and oppositely disposed slidably mounted pressure plates, a source of hydraulic pressure, actuating mechanisms for said forming head, said forming plate, and said pressure plates, hydraulically actuated pistons connected to said source of hydraulic pressure and to said actuating mechanisms, a conduit connecting said pistons in sequence to said hydraulic pressure source and in parallel therewith, said forming head actuating mechanism being connected to the first of said pistons, said forming plate actuating mechanism being connected to the second of said pistons and said pressure plate actuating mechanism being connected to a third said piston, and sequence valves between the connections to said first and second pistons, and between the connections to said second and third pistons, whereby a sequential movement of said plunger and die elements is established and may be regulated.

8. A box-forming machine according to claim 7 in which said forming die comprises oppositely disposed relatively slidable ledge plates for supporting paper blanks pressed into said die, said ledge plates being arranged for movement toward and away from blank supporting position, said machine also including a hydraulically actuated piston, means connecting said piston to said ledge plates for moving said ledge plates to blank supporting position for the box-forming operation and away from said position after the box-forming operation has been performed, and means connecting said last named piston to said hydraulic pressure source in parallel therewith intermediate said source and the first said sequence valve, whereby the said ledge plates are caused to move to box supporting position simultaneously with the movement of the said forming head towards said die.

9. A box-forming machine according to claim 8 wherein said connecting means comprises an adjustable bleeder valve positioned intermediate said first piston connection to said connecting means and said source of hydraulic pressure, whereby the rate of movement of said plunger and die elements may be regulated.

10. A box-forming machine comprising two forming plungers, cooperating expansible and contractible forming dies associated with said plungers respectively, hydraulically actuated means connected to each said plunger and die for effecting working movement thereof, a source of hydraulic pressure, and means connecting the hydraulically actuated means to said source of hydraulic pressure for simultaneously effecting the working movement of said plungers and dies.

11. A box-forming machine comprising two spaced expansible and contractible dies having slidable end plates, means for contracting the dies simultaneously including two differentially acting mechanisms connected to the corresponding end plates of each of said dies respectively, hydraulically driven thrust elements connected to each of said mechanisms, and a common source of hydraulic pressure connected to both said hydraulically driven thrust elements, whereby the said dies may be contracted to a different extent during the box-making cycle of the machine.

12. A box-forming machine according to claim 1 in which said actuating mechanism including said hydraulically actuated elements comprises mechanism operatively connecting plate of each said die to a single one of said hydraulically actuated elements, whereby both said dies may be contracted simultaneously, said mechanism permitting the contraction of each of said dies to a different extent.

13. A box-forming machine according to claim 3 in which said actuating mechanism including said hydraulically actuated elements comprises mechanism operatively connecting the corresponding pressure plates of each said die to one said hydraulically actuated element, whereby both said dies may be contracted simultaneously, said mechanism permitting the contraction of each of said dies to a different extent.

14. A box-forming mechanism according to claim 4 in which said actuating mechanism including said hydraulically actuated elements comprises mechanism operatively connecting the corresponding pressure plates of each said die to one said hydraulically actuated element, whereby both said dies may be contracted simultaneously, said mechanism permitting the contraction of each of said dies to a different extent.

15. A box-forming machine according to claim 11 in which each of said differentially acting mechanisms comprises a lever pivoted to one of said hydraulically driven thrust elements, and two additional levers, which are respectively fulcrumed to a fixed abutment and pivoted at one of their ends to said first named lever, and at their other ends to the respective corresponding end plates of said dies.

16. A box-forming machine according to claim 1 in which said actuating mechanism including hydraulically actuated elements comprises a lever pivoted to each of said hydraulically actuated elements, and two additional levers, which are respectively fulcrumed to a fixed abutment and pivoted at one of their ends to said first named lever, and at their other ends to the respective corresponding pressure plates of said dies, whereby each of said dies may be contracted to a different extent during the box-forming cycle of said machine.

17. A box-forming machine according to claim 3 in which said pressure plate actuating mechanism including hydraulically actuated elements comprises a lever pivoted to each of said hydraulically actuated elements, and two additional levers, which are respectively fulcrumed to a fixed abutment and pivoted at one of their ends to said first named lever, and at their other ends to the respective corresponding pressure plates of said dies, whereby each of said dies may be contracted to a different extent during the box forming cycle of said machine.

18. A box-forming machine according to claim 4 in which said pressure plate actuating mechanism including hydraulically actuated elements comprises a lever pivoted to each of said hydraulically actuated elements, and two additional levers, which are respectively fulcrumed to a fixed abutment and pivoted at one of their ends to said first named lever, and at their other ends to the respective corresponding pressure plates of said dies, whereby each of said dies may be contracted to a different extent during the box-forming cycle of said machine.

19. A box-forming machine according to claim 1 in which said connecting means comprises a first fluid circuit connected to said hydraulically actuated elements whereby said dies are moved into box-forming positions, and a second fluid circuit connected to said elements whereby said dies are moved to box-disengaging position, a control valve for alternately connecting the source of fluid pressure to said named circuits, and means for automatically cycling the said control valve between the named alternate connections.

20. A box-forming machine according to claim 3 in which said connecting means comprises a first fluid circuit connected to said hydraulically actuated elements whereby said dies are moved into box-forming positions, and a second fluid circuit connected to said elements whereby said dies are moved to box-disengaging position, a control valve for alternately connecting the source of fluid pressure to said named circuits, and means for automatically cycling the said control valve between the named alternate connections.

21. A box-forming machine according to claim 4 in which said connecting means comprises a first fluid circuit connected to said hydraulically actuated elements whereby said dies are moved into box-forming positions, and a second fluid circuit connected to said elements whereby said dies are moved to box-disengaging position, a control valve for alternately connecting the source of fluid pressure to said named circuits, and means for automatically cycling the said control valve between the named alternate connections.

22. A box-forming machine according to claim 6 in which said connecting means comprises a first fluid circuit connected to said hydraulically actuated elements whereby said dies are moved into box-forming positions, and a second fluid circuit connected to said elements whereby said dies are moved to box-disengaging position, a control valve for alternately connecting the source of fluid pressure to said named circuits, and means for automatically cycling the said control valve between the named alternate connections.

23. A box-forming machine according to claim 7 in which said conduit connecting said pistons in sequence provides a first fluid circuit whereby said dies are moved into box-forming positions, said machine also comprising a second fluid circuit connected to said elements whereby said dies are moved to box-disengaging position, a control valve for alternately connecting the source of fluid pressure to said named circuits, and means for automatically cycling the said control valve between the named alternate connections.

24. A box-forming machine comprising a forming plate and a forming head arranged for reciprocal movement towards and away from a box-forming position, and a contractible and expansible die arranged to cooperate with said head and plate in forming boxes from blanks, said die comprising slidable pressure plates and slidable ledge plates arranged for movement towards and away from a box-forming position, actuating means for moving all said named elements towards and away from box-forming position, said means comprising a hydraulic piston operatively connected to each of said named elements, a single source of hydraulic pressure, and means for selectively applying said pressure to either side of said pistons.

25. A box-forming machine comprising a forming plate and a forming head arranged for reciprocal movement towards and away from a box-forming position, and a contractible and expansible die arranged to cooperate with said head and plate in forming boxes from blanks, said die comprising slidable pressure plates and slidable ledge plates arranged for movement towards and away from a box-forming position, actuating means for moving all said named elements towards and away from box-forming positions, said means comprising hydraulic pistons operatively connected to each of said named elements, a single source of hydraulic pressure, means for connecting one side of all said pistons to said pressure in parallel therewith, and adjustable pressure resistances in said connecting means to retard the application of pressure to certain of said pistons, said resistances and certain pistons being connected in order to said source corresponding to the desired sequence of movement of the elements actuated by said certain pistons.

26. A box-forming machine according to claim 25 in which the pistons operatively connected to said ledge plates, forming plate, forming head, and pressure plates are connected in parallel with said pressure source in the named order, and in which an adjustable resistance is interposed in said connecting means between the connections to said second and third, and said third and fourth named pistons, whereby the ledge plates will be moved to box-forming position simultaneously with the said forming plate, and said forming head will be moved to box-forming position subsequent to said forming plate and ledge plates and prior to the movement of said pressure plates to box-forming position.

27. A box-forming machine according to claim 26 in which said actuating means comprises means for connecting the other sides of the named pistons to said hydraulic pressure source in parallel therewith for causing the return of all the named elements to their initial position, said last named connecting means comprising a first connection to said pressure plate actuating piston and connections to the other said hydraulic pistons in parallel with said first connection, and an adjustable pressure resistance in said last named connecting means between said first connection and the said parallel connections to the other said hydraulic pistons, whereby said pressure plates are returned to their initial position prior to the simultaneous return of all the remaining elements to their initial positions.

28. A box-forming machine according to claim 27 in which said actuating means comprises a control valve connected to both said connecting means and said hydraulic pressure source, whereby said hydraulic pressure may be selectively applied to said first or second named connecting means to selectively cause said named elements to move towards or away from box-forming position.

29. A box-forming machine according to claim 28 which comprises means for cycling said control valve, said control valve having a displaceable connection selecting spindle, a pilot valve selectively controlling the application of pressure against either side of said spindle, whereby the spindle may be moved to connect either of said connecting means to said pressure source, means engaged by said pressure plate at the limit of its box-forming movement for moving said pilot valve to its first position, and further means engaging said pilot valve at the end of the movement of the named elements to their initial position for moving said pilot valve to its second position.

WALLACE LINDSAY.

REFERENCES CITED

The following references are of record in the file of this patent:

UNITED STATES PATENTS

| Number | Name | Date |
|---|---|---|
| 2,120,214 | Gregoire | June 7, 1938 |
| 2,187,123 | Harm | Jan. 16, 1940 |
| 2,189,105 | Evans | Feb. 6, 1940 |
| 2,226,588 | Simpson | Dec. 31, 1940 |
| 2,243,352 | MacDonald | May 27, 1941 |
| 2,264,461 | Steves | Dec. 2, 1941 |
| 2,353,638 | Beaulieu | July 18, 1944 |